United States Patent [19]

Owen et al.

[11] Patent Number: 4,755,138
[45] Date of Patent: Jul. 5, 1988

[54] FLUIDIZED BED CALCINER APPARATUS

[75] Inventors: Thomas J. Owen, West Richland; Michael J. Klem, Jr.; Robert J. Cash, both of Richland, all of Wash.

[73] Assignee: The United States of America as represented by the United States Department of Energy, Washington, D.C.

[21] Appl. No.: 47,569

[22] Filed: Apr. 23, 1987

Related U.S. Application Data

[63] Continuation of Ser. No. 908,069, Sep. 16, 1986, abandoned.

[51] Int. Cl.$^4$ ............................................. F27B 15/20
[52] U.S. Cl. ...................................... 432/58; 432/15; 110/245
[58] Field of Search ..................... 432/15, 58; 110/245; 431/171

[56] References Cited

U.S. PATENT DOCUMENTS

| | | | |
|---|---|---|---|
| 2,404,944 | 7/1946 | Brassent | 432/58 |
| 2,715,565 | 8/1955 | McKay | 432/58 |
| 2,812,592 | 11/1957 | Knibbs et al. | 432/58 |
| 3,342,378 | 9/1967 | Mezoff et al. | |
| 3,419,253 | 12/1968 | Eckert . | |
| 3,463,617 | 8/1969 | Takeuchi . | |
| 3,497,324 | 2/1970 | Loewen . | |
| 3,505,026 | 4/1970 | Hudson . | |
| 3,829,983 | 8/1974 | White . | |
| 3,862,296 | 1/1975 | Dotson et al. | |
| 3,886,972 | 6/1975 | Scott et al. | |
| 3,910,755 | 10/1975 | Syska | 432/58 |
| 4,079,120 | 3/1978 | Cole et al. | |
| 4,213,938 | 7/1980 | Pyzel | 432/15 |
| 4,241,021 | 12/1980 | Skrzek . | |
| 4,402,665 | 9/1983 | Korenberg | 432/58 |
| 4,416,418 | 11/1983 | Goodstine et al. | 110/245 |
| 4,472,358 | 9/1984 | Khudenko . | |
| 4,476,098 | 10/1984 | Nakamori et al. | |
| 4,485,840 | 12/1984 | Erwin . | |
| 4,521,378 | 6/1985 | Ichimura et al. | |
| 4,521,379 | 6/1985 | Beane . | |
| 4,589,355 | 5/1986 | Chastain et al. | 110/245 |

FOREIGN PATENT DOCUMENTS 8049626 3/1983 Japan .

OTHER PUBLICATIONS

J. A. Demiter, M. J. Klem, C. N. Krohn and T. J. Owen, "Wet Scrap Recovery Program, Final Report," HEDL-TC-2480 (Feb. 1984).

(List continued on next page.)

Primary Examiner—Henry C. Yuen

[57] ABSTRACT

An apparatus for remotely calcining a slurry or solution feed stream of toxic or hazardous material, such as ammonium diurante slurry or uranyl nitrate solution, is disclosed. The calcining apparatus includes a vertical substantially cylindrical inner shell disposed in a vertical substantially cylindrical outer shell, in which inner shell is disposed a fluidized bed comprising the feed stream material to be calcined and spherical beads to aid in heat transfer. Extending through the outer and inner shells is a feed nozzle for delivering feed material or a cleaning chemical to the beads. Disposed in and extending across the lower portion of the inner shell and upstream of the fluidized bed is a support member for supporting the fluidized bed, the support member having uniform slots for directing uniform gas flow to the fluidized bed from a fluidizing gas orifice disposed upstream of the support member. Disposed in the lower portion of the inner shell are a plurality of internal electric resistance heaters for heating the fluidized bed. Disposed circumferentially about the outside length of the inner shell are a plurality of external heaters for heating the inner shell thereby heating the fluidized bed. Further, connected to the internal and external heaters is a means for maintaining the fluidized bed temperature to within plus or minus approximately 25° C. of a predetermined bed temperature. Disposed about the external heaters is the outer shell for providing radiative heat reflection back to the inner shell.

13 Claims, 3 Drawing Sheets

OTHER PUBLICATIONS

M. J. Klem, "1985 I-R100 Entry Form, Advanced Fluidized Bed Caliciner," (Feb. 1985).

Letter, R. R. Jones, Editor and I-R100 Chairman, *Research & Development* magazine to M. J. Klem (Jun. 24, 1985).

M. C. Druby, Press Release, "Westinghouse Hanford Design Improvements Win I-R100 Award," HEDL 85-08-46.

R. J. Cash, to News Release Respondents, "IR-100 Award—Advanced Fluidized Bed Calciner."

M. C. Druby, Text for I-R100 Display—Westinghouse Hanford Company.

"R&D Magazine Selects 100 Most-Significant Technological Advances," *Research and Development* magazine, vol. 27, No. 10, pp. 61-108 (Oct. 1985).

Westinghouse Hanford Wins Device Improvement Award," *Tri-City Herald* newspaper.

"Best of 1984:I-R 100 Announced," Nuclear News Magazine, pp. 112, 114 (Nov. 1985).

Document No. 908E582: Assembly Calciner—As Built.

Document No. 908E582: Assembly Calciner—As Built (Parts List Loading Form).

Document No. 908E580: Assembly Feed Nozzle—Calciner As Built.

Document No. 908E580: Assembly Feed Nozzle—Calciner As Built (Parts List loading Form).

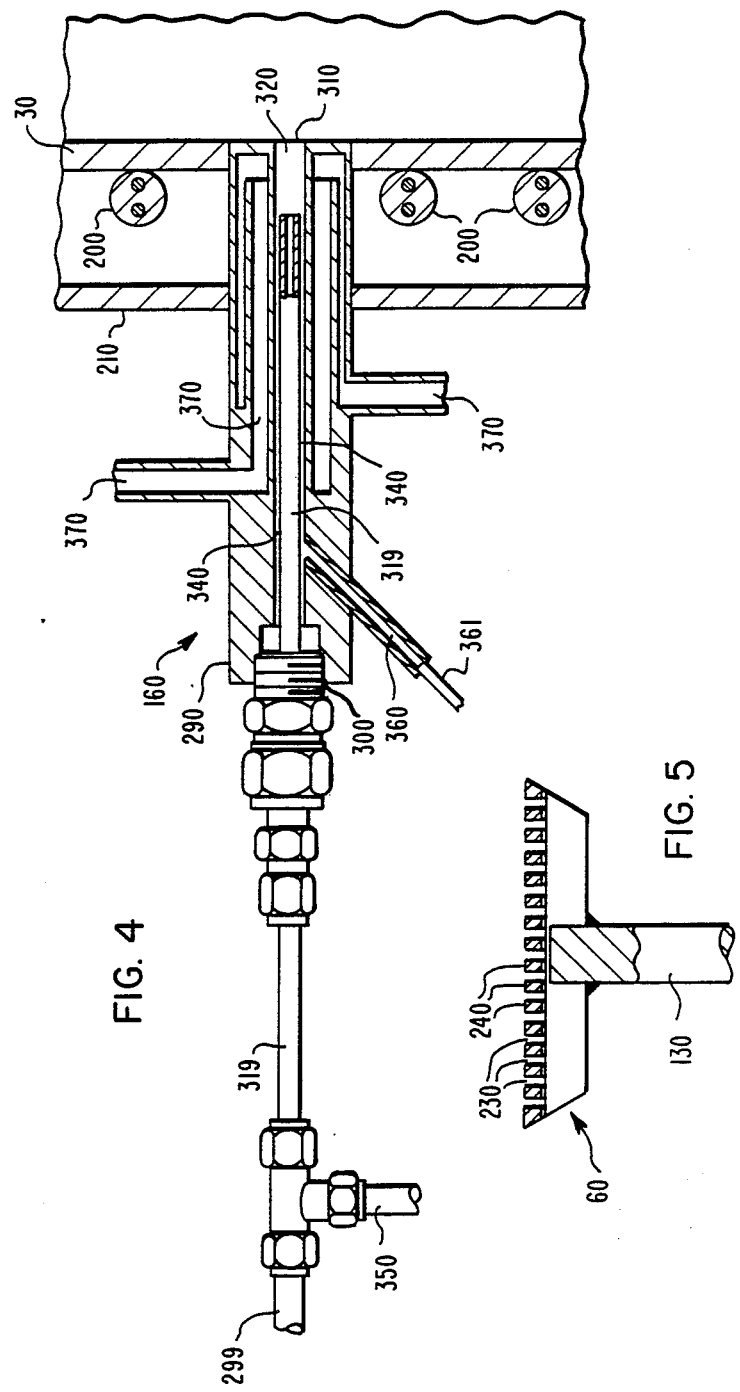

FLUIDIZED BED CALCINER APPARATUS

This application is a continuation of application Ser. No. 908,069 filed Sept. 16, 1986 abandoned.

BACKGROUND OF THE INVENTION

This invention relates to a calcining apparatus and more particularly to a fluidized bed calcining apparatus for remotely calcining a slurry or solution feed stream which may be toxic or hazardous material such as uranium or plutonium bearing compounds.

In a typical fluidized bed calciner a feed stream or organic or inorganic material is thermally reduced to a powder which is retrieved for storage or for further chemical processing. The feed material undergoing calcination is turned into powder-like particulates by the application of heat wherein the temperature is below the melting point of the feed material yet high enough to release carbon dioxide, bound water or other volatile impurities.

In one type of fluidized bed calciner the powder-like particulates remain suspended in the calciner by the upflow of a conveying gas stream which conveys the powder through the reaction chamber of the calciner to the calciner outlet. The suspended bed of particulates which flows through the reaction chamber to the calciner outlet thereby obtains the characteristics of a fluid and thus the bed may be referred to as a fluidized bed. A perforated support member is placed below the fluidized bed but above the source of the conveying gas stream to support the bed and to direct the flow of the conveying gas. Generally, feed material is introduced into the fluidized bed calciner through a feed nozzle device which sprays the feed material into the calciner. Heat is supplied for the calcining process by a plurality of heaters internally or externally disposed to the calciner.

In general, a fluidized bed calciner may be used to reduce high purity organic or inorganic feed material to oxide powder. Thus, a fluidized bed calciner apparatus may be utilized to thermally reduce organic or inorganic feed streams containing dioxins, nitrate wastes or other hazardous materials. Consequently, a fluidized bed calciner apparatus can be employed to convert heavy metal salt slurry or solution feed streams to powder, to thermally reduce hazardous waste feed streams, to decrease waste volume and to provide intermediate chemical treatment of process streams.

In the nuclear energy industry, for example, a fluidized bed calciner apparatus can be used to calcine uranium bearing feed streams into uranium oxide powder. In this instance the feed material may include either depleted waste uranium, natural uranium or enriched uranium. In a typical nuclear industry application, the specific feed material can be either ammonium diuranate (ADU) slurry or uranyl nitrate acid solution.

There are several methods known in the art for calcining organic or inorganic material and for utilizing fluidized beds. The present invention obtains a method that combines the concept of a fluidized bed with that of a calciner to produce a fluidized bed calciner having a compact reaction chamber for use in reducing uranium or plutonium-bearing feed streams for the nuclear energy industry and for reducing other hazardous wastes in nuclear and non-nuclear applications.

One method known in the art for calcining inorganic materials is disclosed by U.S. Pat. No. 3,862,296 issued Jan. 21, 1975 in the name of J. M. Dotson et al. and entitled "Conversion Process For Waste Nitrogen-Containing Compounds" which is assigned to the General Electric Company. This patent utilizes a process for converting nitrogen-containing compounds in a fluidized bed in the presence of a reducing agent consisting of ammonia or ammonium compounds. The bed is fluidized, agitated anad pneumatically conveyed to the calciner outlet by a gaseous medium. U.S. Pat. No. 4,079,120 issued Mar. 14, 1978 in the name of E. A. Cole et al. and entitled "Uranium Dioxide Calcining Apparatus And Method" which is assigned to the Westinghouse Electric Corporation presents a continuous kiln calcining apparatus for calcining compounds of uranium such as ammonium diuranate to produce uranium dioxide. In contrast to the Dotson patent, the Cole et al. apparatus comprises a rotating kiln containing a helical screw to agitate and mechanically convey the bed to the calciner outlet.

In a fluidized bed calciner apparatus it is preferably for efficient operation that an appropriate design be employed for a bed support member. One such design is disclosed by U.S. Pat. No. 3,463,617 issued Aug. 26, 1969 in the name of S. Takeuchi and entitled "Supporting Plate For Fluidized Bed Apparatus" which is assigned to Mitsui Shipbuilding and Engineering Company Limited. This patent presents an apparatus for roasting particulate matter, the apparatus having a horizontal plate supporting a bed of the material situated above a plenum containing hot gases which flow upward through the plate to fluidize and heat the particulate matter. This support plate is designed to impart a swirling motion to hot gases flowing upward through the plate, the gases contacting the efficiency of the apparatus. The plate is comprised of hollow, rectangular blocks each having a series of ports to allow the hot gases to flow through the plate.

In addition to an appropriately designed bed support plate, it is desirable that an efficient design be utilized for the feed stream feed nozzle which is used to spary the slurry or solution feed stream into the reaction chamber and fluidized bed. An example of a feed nozzle is disclosed by U.S. Pat. No. 3,497,324 issued Feb. 24, 1970 in the name of B. F. Loewen and entitled "Dual Fluid Injector Assembly" which is assigned to the Phillips Petroleum Company. In this device which is used to introduce hydrocarbon feedstock into a carbon black furnace, a dual fluid feed nozzle assembly comprises conduits positioned in an axial, concentric relationship forming an annulus within the assembly. Feed material flows through the inner conduit while a jacket of air flows through the annulus surrounding the inner conduit. The jacket of air is used to reduce the accumulation of deposites on the discharge ends of the inner conduit and annulus.

A precursor to the present invention was the fluidized bed calciner experimental model developed by the General Electric Company Vallecitos Nuclear Center for the COPRECAL (C O P R Ecipitation and C A Lcination) research and development project sponsored by the Department of Energy. This device comprised a vertical cylindrical calciner reaction chamber. An ammonium diuranate (ADU) feed stream was sprayed into the reaction chamber through a water-cooled feed nozzle. The fluidized bed comprising shperical Inconel or similar nickel alloy beads and feed material was fluidized by an upflow of heated nitrogen gas. The Inconel beads were sprayed with feed material from the feed nozzle. The calcining process converted the feed material into a powder-like substance which adhered to the Inconel beads. The powder then separated from the surface of the beads by the agitation of the beads induced by the fluidizing gas and by the operation of a jet grinder nozzle device that utilized a continuous jet of gas to impinge the beads onto a target plate disposed in the reaction chamber. At that point, the fluidizing gas conveyed the powder to the calciner outlet. The fluidized bed temperature was to be maintained at 400° C. by internal and external heaters. The calciner reaction chamber was three inches in diameter, thirty inches in length and designed to process 500 grams or uranium dioxide ($UO_2$) per hour at a feed concentration of 325 gU/liter in 2.5M $HNO_3$.

As part of the Wet Scrap Recycle (WSR) Development Program the Hanford Engineering Development Laboratory (HEDL), operated for the Deparatment of Energy (DOE) by the Westinghouse Electric Corporation, fabricated and tested the calciner built by General Electric. The following difficulties were encountered during opeation: (1) the efficiency of the internal heaters significantly decreased after a few hours of operation due to heater failure; (2) after shutdown, the fluidized bed could not be conveniently refluidized; (3) the feed nozzle became plugged by slurry feed material during operation and by Inconel beads during shutdown; and (4) maintaining a constant system operating temperature was difficult.

Consequently, while the prior art devices provided calciners that performed with some efficiency, these calciners evinced difficulties in maintaining a uniformly fluidized bed at high system operating temperatures.

Therefore, what is needed is a fluidized bed calciner capable of being operated at higher temperatures without heater failure, of being conveniently refluidized after shutdown, of having a means to mitigate plugging of the feed nozzle, and capable of maintaining a sufficiently constant system operating temperature.

SUMMARY OF THE INVENTION

The fluidized bed calciner comprises a vertical cylindrical shell for remotely calcining a slurry or solution feed stream which may be hazardous material such as toxic waste or uranium or plutonium bearing compounds. Disposed inside the lower portion of the cylindrical shell is a support member for supporting the fluidized bed and for directing a uniform gas flow to the fluidized bed. The fluidized bed calciner also comprises a feed nozzle, a plurality of internal spherical beads, a plurality of internal and external heaters, a tubular feed means for delivering feed material to the feed nozzle, means for conveying the feed material from the feed nozzle to the fluidized bed, means for cleaning the feed nozzle outlet orifice and the beads and means for controlling the fluidized bed temperature to within a predetermined neighborhood of the desired fluidized bed operating temperature.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

FIG. 4 is a cross-sectional view of the feed nozzle disposed in the fluidized bed calciner inner and outer shell walls; and FIG. 5 is a partial cross-sectional view along line V—V of FIG. 2 illustrating the fluidized bed support member.

DESCRIPTION OF THE PREFERRED EMBODIMENT

Reduction of hazardous material may require the use of a calcining apparatus. The invention described herein is a fluidized bed calciner capable of being used to remotely calcine hazardous material such as uranium or plutonium bearing compounds.

Figure 1:
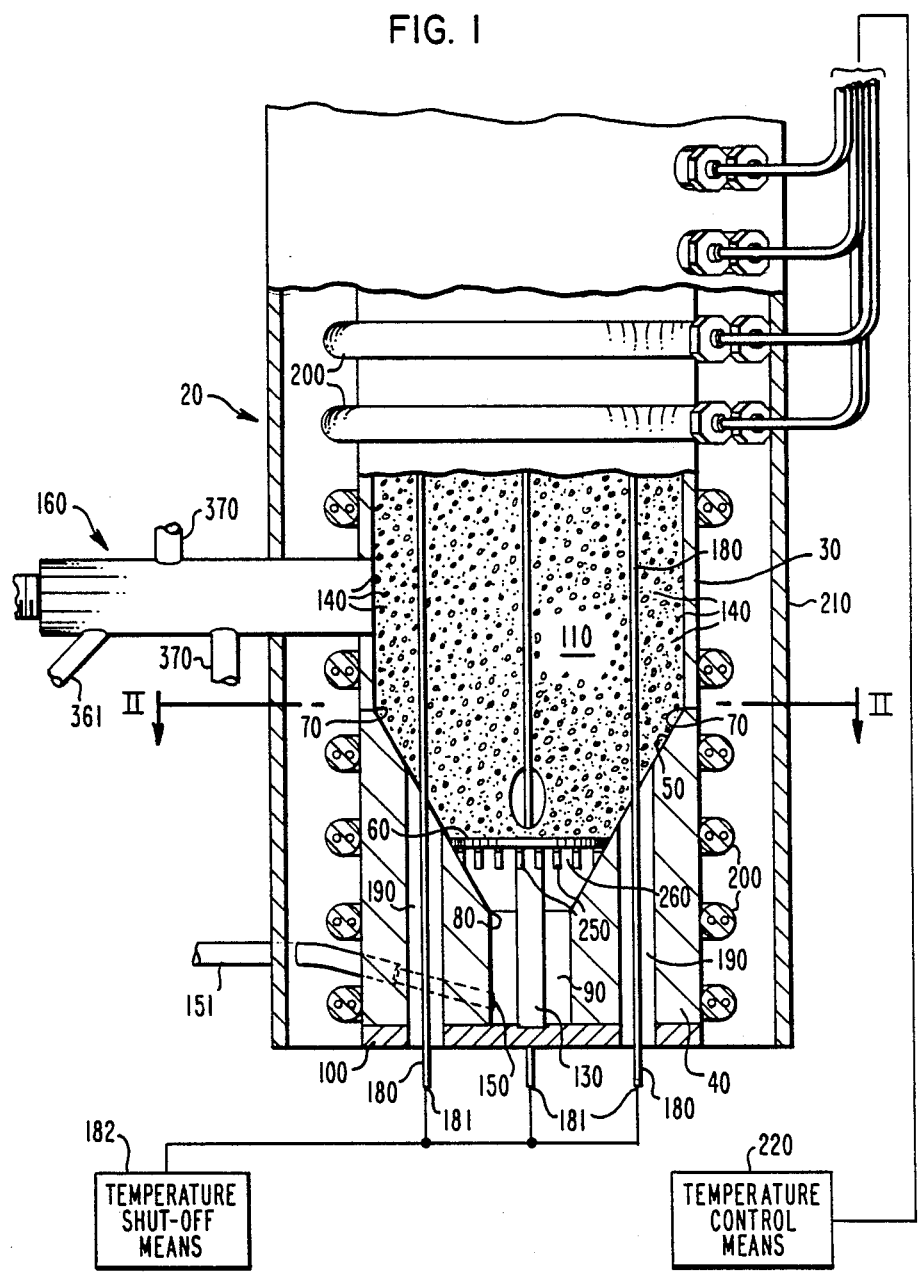
FIG. 1 is a partial cross-sectional view in elevation of the lower portion of the fluidized bed calciner.

Referring to FIG. 1, the fluidized bed calciner is referred to generally as 20 and comprises a vertical substantially cylindrical inner shell 30 which may be Schedule 40 304 stainless steel. The inner shell 30 may be approximately 3 inches in inside diameter or substantially larger in inside diameter and sealed at the top-most end thereof by a top closure plate (not shown), which may be welded to inner shell 30, except for a product output port (not shown) providd in the closure plate for exit of the calcined product from the fluidized bed calciner 20. Extending across the bottom-most end of inner shell 30 and attached thereto, which may be by welding, is a bottom end cap 40, which may be stainless steel, having a conically-shaped inside surface 50 for receiving a substantially circular and horizontal fluidized bed support member 60 and defining a larger diameter 70 at the top end of the conically-shaped inside surface 50 and a smaller diameter 80 at the bottom end thereof. Contiguous to and continuous with the smaller diameter 80 of the inside surface 50 is a substantially cylindrical first cavity 90 which extends from the smaller diameter 80 to an end plate 100 and terminates thereat.

Extending across and disposed on the inside surface 50 is the member 60, which may be stainless steel, in communication with a fluidized bed 110 and disposed on the inside surface 50 such that the circumferential edge of member 60 abuts the wall of the inside surface 50 for supporting bed 110 and for providing uniform rectangular slots 120 (see FIG. 2) for uniform gas flow to the bed 110. The member 60 is supported from below by a vertical tubular plate support mast 130, which may be stainless steel, secured, which may be by welding, to support member 60 at the top-most end of mast 130 and secured to end plate 100 at the bottom-most end thereof, wherein the end plate 100 substantially seals inner shell 30. The support mast 130 extends vertically from end plate 100, through the first cavity 90 and to member 60.

Referring again to FIG. 1, disposed in fluidized bed 110 is a plurality of spherical beads 140, which may be Inconel 625 and approximately 0.035 inch in diameter, to provide a heat transfer surface area for uniform fine-grain powder formation and to inhibit in-process product holdup. The beads 140 are larger than the slots 120 (see FIG. 2), which are disposed in support member 60, so that the beads 140 do not pass downwardly through the slots 120 and thereafter plug a fluidizing gas orifice 150 or first cavity 90. Gas orifice 150 is disposed in one end of a fluidizing gas first conduit 151 which is connected to a first gas supply means (not shown) at one end thereof and to first cavity 90 at the other end thereof for providing a path for fluidizing gas flow from first gas supply means to first cavity 90. The beads 140, which may comprise a total voume approximately of 800 cubic centimeters or substantially greater, are sprayed with feed material, such as ammonium diuranate slurry or uranyl nitrate solution or toxic waste, from a feed nozzle generally designated by numeral 160. The calcining process then converts the feed material, some of which adheres to the beads 140, into a fine-grain powder such as uranium oxide. As described presently, the powder separates from the surfaces of the beads 140 due to the operation of an internal jet grinder nozzle (not shown) and due to the bouncing motion of the beads 140 induced by the upwardly force of the fluidizing gas which conveys the powder to the product output port. Disposed in the upper portion of inner shell 30 is a plurality of baffles (not shown) for creating barriers to prevent the bouncing beads 140 from leaving the inner shell 30 through the product output port.

Disposed in the lower portion of inner shell 30 and downstream of feed nozzle 160 is the jet grinder nozzle (not shown) which is in communication with a second gas supply means (not shown) such as a traditional gas supply means device for minimizing the accumulation of converted solids on the beads 140 disposed in bed 110. A gas, which may be air preheated to approximately 400° C., flows from the second gas supply means device through the jet grinder nozzle to the bed 110 and impinges the beads 140 against a target plate (not shown), which may be a stainless steel square approximately 0.5 inch on each side, with sufficient force to dislodge the converted solids from the surfaces of the beads 140 thereby minimizing accumulation of converted solids on the beads 140 so that heat transfer occurs between the beads 140 and the feed materiala being calcined.

Figure 2:
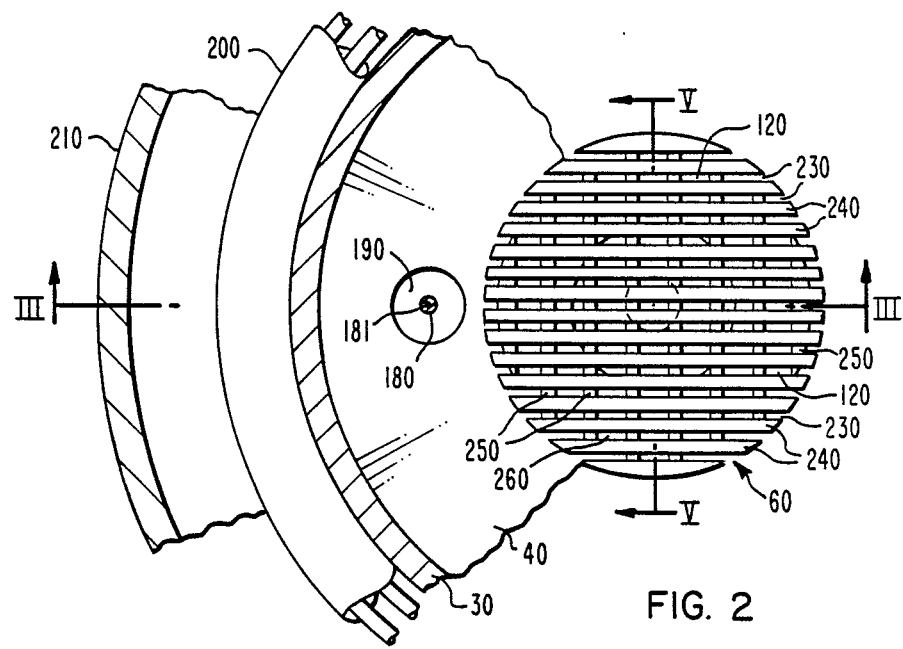
FIG. 2 is a partially elevated view along line II—II of FIG. 1 illustrating the fluidized bed support member disposed in the fluidized bed calciner.
Figure 3:
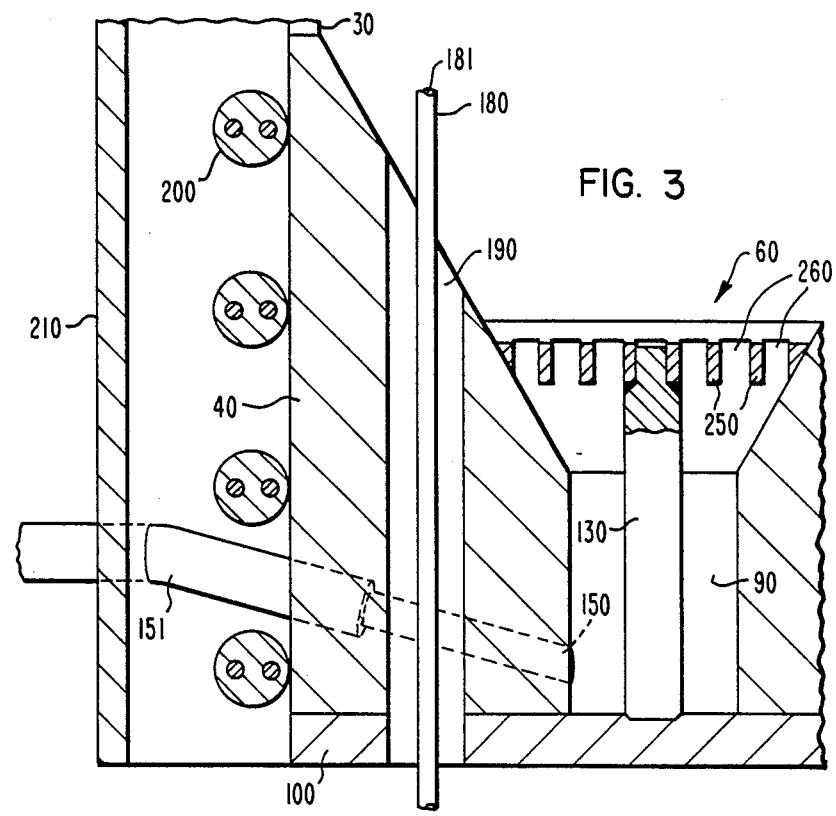
FIG. 3 is a view along line III—III of FIG. 2.

Referring to FIGS. 1-3, an electric current, which flows from an electrical source, passes through a plurality of vertical tubular internal heaters 180 which are disposed in the lower portion of inner shell 30 and which are in communication with fluidized bed 110 for heating fluidized bed 110 by heat conduction and radiation. Connectors (not shown) are disposed on the basae portion of each internal heater 180 and are configured to aid in installation and removal of each internal heater 180. There may be 5 internal heaters 180, such as Firerod heaters having a temperature rating of 900° C. available from Watlow Electric Company located in St. Louis, Mo., preferably approximately 12 inches in active length, approximately 0.5 inch in diameter and clad in Inconel 625. Electric current passes through internal heaters 180 dissipating approximately 1 KW in each heater for heating the bed 110. The lower portion of each internal heater 180 is disposed in a second cavity 190.

Electric current, which flows from an electrical source, passes through a plurality of external heaters 200 disposed circumferentially about the outside length of inner shell 30 for heating inner shell 30 thereby heating bed 110 by heat conduction and radiation. There may be 13 external heaters 200, such as Calrod band heaters available from Watlow Electric Company located in St. Louis, Mo., each dissipating 1 KW of electric power. Disposed about external heaters 200 is a vertical substantially cylindrical outer shell 210 for providing radiative heat reflection from the external heaters back to inner shell 30.

Disposed in internal heaters 180 are a plurality of first thermocouples 181 for sensing bed 110 temperature and having a temperature shut-off means 182 for turning-off heaters 180 when bed 110 temperature exceeds a predetermined maximum. A second thermocouple (not shown) is disposed near the top of the beads 140. The second thermocouple is connected to external heaters 200 and to a temperature control means 220 for controlling bed 110 operating temperature to within plus or minus approximately 25° C. of the desired bed 110 operating temperature. The combination of internal heaters 180, external heaters 200, and temperature control means 220 maintains the bed 110 at a desired operating temperature which is preferably between approximately 400° C. and 700° C. plus or minus approximately 25° C. of the desired bed 110 operating temperature.

Referring to FIGS. 1, 2, 3 and 5, a plurality of parallel first channels 230, defined by a plurality of parallel substantially rectangular first ridges 240, traverse the top surface of member 60 and extend without interruption from one circumferential edge of member 60 to the other edge thereof and extend from the top surface of member 60 to the bottom surface thereof except where first channels 230 intersect a plurality of parallel substantially rectangular second ridges 250 which define a plurality of parallel second channels 260. Second channels 260 traverse the bottom surface of member 60 and extend without interruption from one circumferential edge of member 60 to the other edge thereof and extend from the bottom surface of member 60 to the top surface thereof except where second channels 260 intersect first ridges 240. The second channels 260 are arranged perpendicularly to first channels 230, which arrangement forms a through-member checkerboard lattice of rectangular slots 120. The first channels 230 and the second channels 260 may be formed by simultaneous machining on the top and bottom surfaces of a one-piece metal blank which may be stainless steel. The slots 120 uniformly direct gas flow to bed 110 which is disposed downstream of member 60 and which is in communication with member 60. The gas, which may be nitrogen, flows upwardly from the gas orifice 150 through first cavity 90, through slots 120 and to bed 110 for fluidizing bed 110. Uniform gas flow through member 60 is achieved by the approximate equidistant and uniform placement of the slots 120. The size of each slot 120 is smaller than the minimum diameter of any bead 140 for preventing the beads 140 from passing downwardly through the slots 120 and plugging the gas orifice 150. The uniform gas flow and beads 140 aid uniform heat transfer within bed 110 thereby producing product output of approximatly uniform consistency of calcination and powder particulate size. Alternatively, support member 60 may comprise parallel first bars extending from one circumferential edge of support member 60 to the other edge thereof and parallel second bars extending from one circimferential edge of support member 60 to the other edge thereof, the intersection of the first bars and the second bars defining a lattice of slots for directing uniform or non-uniform gas flow from the gas orifice 150 to fluidized bed 110.

Referring to FIGS. 1 and 4, there is illustrated feed nozzle 160 which is disposed thorugh the outer shell 210 and the inner shell 30 downstream of member 60 for delivering feed material to bed 110 froma feed material supply means. Feed nozzle 160, which may be stainless steel, comprises a body 290 with an inlet orifice 300 disposed in one end of body 290 and with an outlet orifice 310 disposed in the other end thereof. Extending from inlet orifice 300 to outlet orifice 310 is a continuous third cavity 320 through which third cavity 320 feed material flows to fluidized bed 110. The third cavity 320 also serves as a conduit for delivering a cleaning chemical to cavity 320, outlet orifice 310 and beads 140. Cleaning of beads 140, outlet orifice 310 and third cavity 320 may be performed with the cleaning chemical following completion of calcination. The cleaning chemical, which may be nitric acid solution or water, chemically scrubs the beads 140 of residual feed material and removes feed material from outlet orifice 310 and from third cavity 320 when the beads 140 are refluidized following completion of a previous calcination.

Referring to FIG. 4, a hollow tubular feed means 319, which may be stainless steel, is inserted through inlet orifice 300 and into third cavity 320 to approximately 0.25 inch from outlet orifice 310, for delivering the feed material or the cleaning chemical into third cavity 320. When inserted into third cavity 320, feed means 319 defines an annulus 340 between the exterior surface of feed means 319 and the interior wall of third cavity 320. A cleaner supply conduit 350, one end of which is connected to a cleaner supply means, is connected to feed means 319. The conduit 350 utilizes the cleaning chemical for chemically scrubbing the beads 140 and for flushing outlet orifice 310, third cavity 320, and feed means 319.

Again referring to FIG. 4, extending from the exterior surface of body 290 to the annulus 340 is a continuous duct 360. The duct 360 provides a path for gas flow to annulus 340. Connected to duct 360 and external to body 290 is a third gas supply conduit 361 that is connected to a third gas supply means, which third gas supply means provides a gas such as nitrogen that flows from the third gas supply means through third conduit 361, through duct 360, through annulus 340 and to third cavity 320 for conveying the feed material from third cavity 320 to outlet orifice 310. The body 290 is cooled to approximately 50° C. by a cooling means 370 disposed therein for preventing precalcination of feed material at outlet orifice 310. The cooling means 370 may be an annular region through which flows a coolant such as water. Alternatively, the cooling means 370 may be disposed circumferentially or longitudinally about the outside surface of body 290.

During operation, an electric current is supplied from an electrical source to the internal heaters 180 and to the external heaters 200. The internal heaters 180, which are disposed in inner shell 30, and the external heaters 200, which are disposed circumferentially about the outside length of inner shell 30 heat bed 110 by conductive and radiative heat transfer. Disposed in internal heaters 180 are the plurality of first thermocouples 181 for sensing bed 110 temperature, first thermocouples 181 having the temperature shut-off means 182 for turning-off heaters 180 when bed 110 temperature exceeds a predetermined maximum. The second thermocouple, which is disposed near the top of beads 140 is connected to external heaters 200 and to the temperature control means 220 for controlling bed 110 operating temperature to within plus or minus approximately 25° C. of teh desired bed 110 operating temperature.

During operation, preheated fluidizing gas, which may be preheated to approximately 350° C. or substantially higher, flows from the fluidizing gas orifice 150 which is connected to the first gas supply conduit 151 upstream of member 60. The preheated gas flows upwardly through the slots 120 disposed in support member 60. The upwardly force of the fluidizing gas agitates the beads 140 disposed downstream of support member 60 causing the beads 140 to bounce wihtin inner shell 30. A slurry or a solution feed material enters feed means 319 and passes into cavity 320 which is disposed in body 290. Gas flows from the third gas supply conduit 361 through duct 360 to annulus 340 for conveying the feed material from cavaity 320 to outlet orifice 310 and for spraying the feed material into bed 110. The coolant flows through cooling means 370 which is disposed in body 290 for cooling body 290. The internal jet grinder nozzle supplies preheated gas to bed 110 from the second gas supply means for minimizing accumulation of converted solids on the beads 140 in bed 110 thereby aiding in conductive and radiative heat transfer from the beads 140 to the feed material undergoing calcination.

During operation, the beads 140 are sprayed with feed material from feed nozzle 160, the resulting aggregation of beads 140 and feed material forming the substance of the bed 110. The presence of the annulus 340 and the force of the gas flow issuing from annulus 340 mitigate plugging of outlet orifice 310 with feed material. The fluidized bed 110 is heated by internal heaters 180 and external heaters 200. The feed material being calcined in the fluidized bed 110 is turned into powder-like particulates by the application of heat from the internal heaters 180 and external heaters 200 whereby the termperature of bed 110 is below the metling point of the feed material yet high enough to release carbon dioxide and to remove bound water and other volatile impurities. Some of the particulates adhere to the beads 140 which are agitated by the upwardly flow of the gas from the fluidizing gas orifice 150. Fluidizing gas flows upwardly from the gas orifice 150, through the slots 120 and to bed 110. Slots 120 are disposed such that the flow of the fluidizing gas through slots 120 is substantially uniform. Due to the agitation of the plurality of beads 140 and the impact force of the beads 140 against a target plate disposed in the inner shell 30 opposite the jet grinder nozzle, the remaining particulates separate from the beads 140 and are conveyed upwardly through the product output port by the force of the fluidizing gas. The particulates are collected on a filter (not shown) downstream of the product output port for further processing. The beads 140, which also float upwardly due to the force of the fluidizing gas, impinge on the baffles, which are disposed in the upper portion of inner shell 30 upstream of the product output port, and fall downwardly to the fluidized bed 110. Consequently, the baffles act as barriers for preventing the beads 140 from exiting the calciner through the product output port and allow the calcined product to carry over to the product output port.

Therefore, the invention provides a fluidized bed calciner capable of remotely calcining hazardous materials and possessing a means to clean the feed nozzle and fluidized bed following completion of calcination and possessing a means to restart fluidization at will.

What is claimed is:

1. A fluidized bed calciner comprising:
   (a) a vertical substantially cylindrical outer shell;
   (b) a vertical substantially cylindrical inner shell disposed in said outer shell;
   (c) a fluidized bed disposed in said inner shell;
   (d) a substantially circular support member disposed in the lower portion of said inner shell and in communication with the fluidized bed for supporting the fluidized bed and for providing means for uniform fluidization, said support member having parallel first channels disposed from the top to the bottom surfaces of said support member and traversing from one edge of said support member to the other edge thereof, except where the first channels intersect a plurality of parallel substantially rectangular second ridges defined by a plurality of second channels;

(e) said support member having parallel second channels disposed from the bottom to the top surfaces of said support member and traversing from one edge of said support member to the other edge thereof, except where the second channels intersect a plurality of parallel substantially rectangular first ridges defined by the plurality of first channels, said second channels arranged perpendicularly to the first channels, whereby the arrangement of the first channels and the second channels form a through-member checkerboard lattice;

(f) a feed nozzle extending from the exterior of the outer shell and through the outer shell wall and disposed in said inner shell downstream of the support member, having a nozzle body with an outlet orifice in one end thereof and an inlet orifice in the other end and having a continuous cavity between said orifices, for delivering feed material to the fluidized bed and for delivering a cleaning chemical to the fluidized bed, the outlet orifice and the cavity for cleaning said fluidized bed, said outlet orifice and said cavity;

(g) a hollow tubular feed means disposed through said inlet orifice a predetermined distance into said cavity for delivering feed material into said cavity;

(h) the feed means defining an annulus between the exterior surface of said tubular feed means and the cavity wall;

(i) a duct extending from the exterior surface of said nozzle body to the annulus therein for transporting gas from the exterior surface of said nozzle body to the annulus, said gas to aid in transporting feed material from the nozzle cavity to the nozzle outlet orifice;

(j) a gas supply means disposed externally to said nozzle body and in communication with the duct;

(k) a cooling means disposed in the nozzle body for cooling said nozzle body;

(l) a nozzle cleaning means in communication with the hollow tubular feed means for flushing the tubular feed means, the cavity, the nozzle outlet orifice and the fluidized bed;

(m) a plurality of internal heaters disposed in said inner shell, and in communication with the fluidized bed for heating the fluidized bed;

(n) a plurality of external heaters disposed circumferentially about the external length of said inner shell for heating said inner shell thereby heating the fluidized bed;

(o) said internal and external heaters for maintaining the fluidized bed at a predetermined bed operating temperature preferably between approximately 400° C. and 700° C.;

(p) a temperature shut-off means connected to the internal heaters for turning-off the internal heaters when the fluidized bed temperature exceeds a predetermined maximum; and (q) a temperature control means connected to the external heaters for controlling the fluidized bed operating temperature to within approximatey plus or minus 25° C. of said predetermined bed operating temperature.

2. A fluidized bed calciner inclulding a shell, a fluidized bed disposed in said shell, a fluidized bed support member disposed in said shell, said support member in communication with said fluidized bed for supporting said fluidized bed, said support member having a plurality of substantially rectangularly shaped slots for providing means for uniform fluidization, comprising:

(a) a plurality of parallel first channels traversing the top surface of said support member without interruption from one edge to the other edge thereof; and (b) a plurality of parallel second channels disposed perpendicularly to the first channels and traversing the bottom surface of said support member without interruption from one edge to the other edge thereof, said first channels and said second channels forming a checkerboard lattice through which the fluidizing gas passes.

3. The fluidized bed calciner according to claim 2 wherein said support member further comprises a plurality of bars arranged in a checkerboard lattice to define said slots.

4. The fluidized bed calciner according to claim 2 wherein said support member further comprises:

(a) a substantially circular support member disposed in the lower portion of said shell and in communication with the fluidized bed for supporting the fluidized bed, said support member having parallel first channels disposed from the top to the bottom surface of said support member except where the first channels intersect a plurality of parallel substantially rectangular second ridges defined by a plurality of second channels; and (b) said support member having parallel second channels disposed from the bottom to the top surfaces of said support member except where the second channels intersect a plurality of parallel substantially rectangular first ridges defined by the plurality of first channels, said second channels disposed perpendicularly to the first channels, the first channels and the second channels forming a through-member checkerboard latice defining said slots.

5. The fluidized bed calciner according to claim 2 wherein the fluidized bed calciner further comprises a feed nozzle disposed in said shell and disposed downstream of the fluidized bed support member for delivering feed material to the fluidized bed and for delivering a cleaning chemical to the fluidized bed for cleaning said fluidized bed and the feed nozzle.

6. The fluidized bed calciner according to claim 5 wherein the feed nozzle further comprises:

(a) an elongated nozzle body having an outlet orifice in one end thereof and an inlet orifice in the other end thereof and having a continuous cavity between said orifices; and (b) a hollow tubular feed means disposed through said inlet orifice a predetermined distance into said cavity for delivering feed material into said cavity.

7. The fluidized bed calciner according to claim 6 wherein the tubular feed means defines an annulus between the exterior surface of said tubular feed means and the cavity wall.

8. The fluidized bed calciner according to claim 7 wherein the feed nozzle further comprises:
   (a) a duct extending from the exterior surface of said nozzle body to the annulus therein for transporting a gas from the exterior surface to said nozzle body to the annulus, said gas for transporting feed material from the nozzle cavity to the nozzle outlet orifice and for mitigating plugging of the outlet orifice; and
   (b) a gas supply means disposed externally to said nozzle body and in communication with the duct.

9. The fluidized bed calciner according to claim 6 wherein the feed nozzle further comprises:
   (a) a cooling means disposed in the nozzle body for cooling said nozzle body; and
   (b) a cleaning means in communication with the hollow tubular feed means for flushing the tubular feed means, the nozzle body cavity and the nozzle outlet orifice.

10. The fluidized bed calciner according to claim 6 wherein the feed nozzle further comprises a cooling means disposed in the nozzle body for cooling said nozzle body.

11. The fluidized bed calciner according to claim 2 wherein the fluidized bed calciner further comprises a plurality of internal heaters each having a first thermocouple disposed therein for sensing the bed temperature, said internal heaters having a temperature shut-off means for turning-off the internal heaters, said internal heaters disposed in said shell and in communication with the fluidized bed for heating the fluidized bed and for sensing the fluidized bed temperature.

12. The fluidized bed calciner according to claim 2 wherein the fluidized bed calciner further comprises a plurality of external heaters disposed circumferentially about the length of said shell for heating said shell thereby heating the fluidized bed.

13. The fluidized bed calciner according to claim 2 wherein the fluidized bed calciner further comprises:
   (a) a plurality of internal heaters each having a first thermocouple disposed therein for sensing the bed temperature, said internal heaters having a temperature shut-off means for turning-off the internal heaters, said internal heaters disposed in said shell and in communication with the fluidized bed for heating the bed and for sensing the fluidized bed temperature; and
   (b) a plurality of external heaters disposed circumferentially about the length of said shell for heating said shell thereby heating the fluidized bed.

* * * * *